(12) United States Patent
Lee et al.

(10) Patent No.: US 6,377,643 B1
(45) Date of Patent: Apr. 23, 2002

(54) APPARATUS FOR DETECTING A SYNCHRONIZATION SIGNAL IN A DIGITAL DATA RECORD/REPLAY DEVICE

(75) Inventors: Doo-Hee Lee; Tae-Kyoung Kwon, both of Kyungki-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/227,160

(22) Filed: Jan. 8, 1999

(30) Foreign Application Priority Data

Jan. 12, 1998 (KR) .......................................... 1998-596

(51) Int. Cl.$^7$ ................................................ H04L 7/00
(52) U.S. Cl. ........................................ 375/368; 714/798
(58) Field of Search ................................. 375/368, 354, 375/357, 365; 370/503, 514, 520; 714/707, 758, 775, 789, 798

(56) References Cited

U.S. PATENT DOCUMENTS 6,236,631 B1 * 5/2001 Deguchi et al. ......... 369/53.34

* cited by examiner

Primary Examiner—Mohammad H. Ghayour
(74) Attorney, Agent, or Firm—Birch, Stewart, Kolasch & Birch, LLP (57) ABSTRACT

An apparatus for detecting a sync signal in a digital data record/replay device having a parallel clock generator, a parallel data generator, and a window unit comprises: a sync signal detector for comparing a pattern matching sync signal output from a sync pattern detector with an output signal of the window unit and detecting a sync signal according to clocks of the parallel clock generator; a latch unit for latching the sync signal detected by the sync signal detector and outputting the sync signal as a sync position signal according to clocks of the parallel clock generator; an identification error correction code (ID ECC) controller for generating an ID ECC control signal according to the sync position signal of the latch unit; an ID ECC decoder for decoding ID areas of parallel data generated by the parallel data generator; and a sync signal checking unit for outputting the sync position signal of the latch unit as a final sync signal and, when errors are detected as a result of the ID ECC decoding, sending a control signal to the window unit. The present invention can check sync signals using the ID ECC and restore normal sync signals when an initial sync signal is erroneously detected due to unstableness of initial window signal or when sync signals are missed and erroneously detected due to change of clocks during the normal replay.

2 Claims, 5 Drawing Sheets

APPARATUS FOR DETECTING A SYNCHRONIZATION SIGNAL IN A DIGITAL DATA RECORD/REPLAY DEVICE

BACKGROUND OF THE INVENTION

1. Field of the Invention

The present invention relates to a digital data record/replay device and more particularly to an apparatus for detecting a synchronization signal in a digital data record/replay device.

2. Description of Related Art

Typically, erroneously detected sync signals are removed using a fixed window with respect to detected sync signals. At this time, if errors occur in data or a sync signal pattern or if the number of clocks of a predetermined sync signal does not coincide with the number of clocks of an actual sync signal, the detected sync signals may be all missed.

Figure 1:
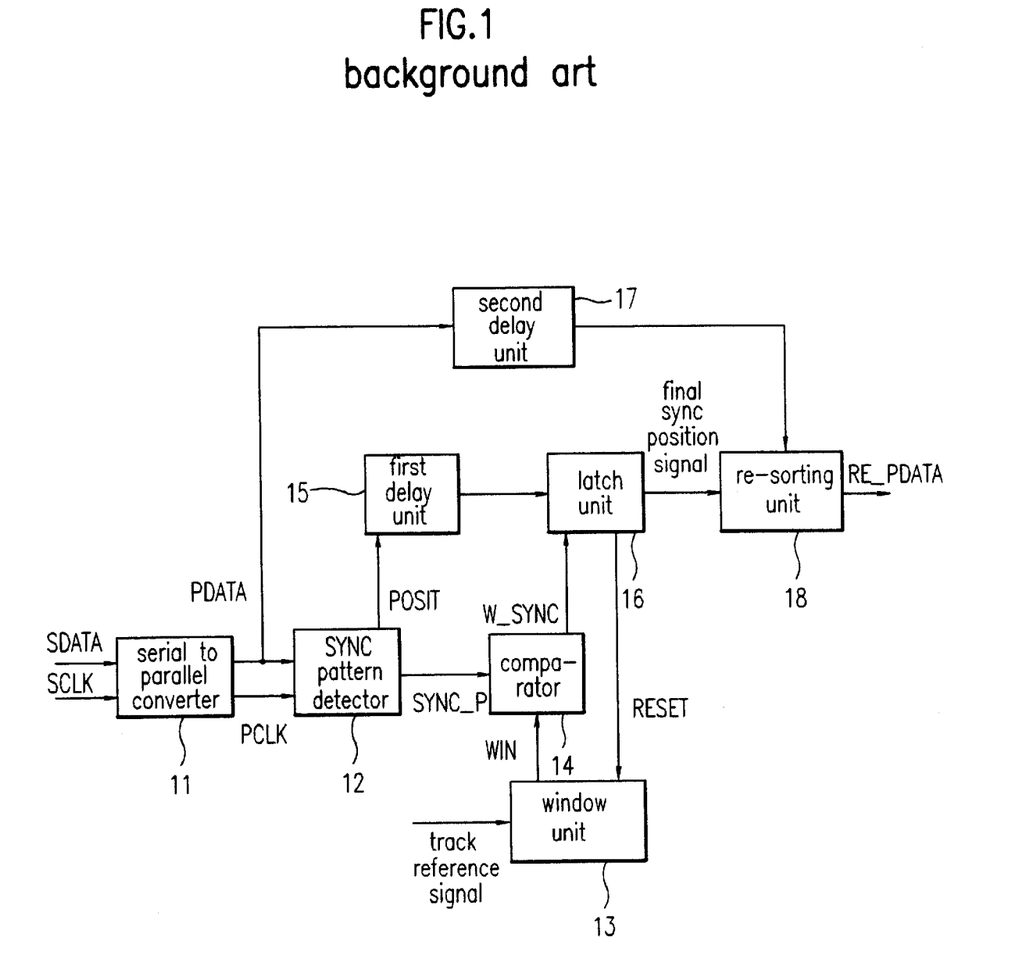
FIG. 1 is a block diagram showing a configuration of an apparatus for detecting a sync signal in a digital data record/replay device according to a background art.

FIG. 1 is a block diagram showing a configuration of a conventional apparatus for detecting a sync signal in a digital data record/replay device. The conventional apparatus includes: serial to parallel converter 11 for converting serial data, SDATA, and serial clocks, SCLK, which have been input as a result of reconstructing recorded data using an equalizer and phase locked loop (PPL), into parallel data, PDATA, and parallel clocks, PCLK; sync pattern detector 12 for comparing the parallel data, PDATA, and the parallel clocks, PCLK, received from the serial to parallel converter 11 with a predetermined sync pattern and for producing a pattern matching sync, SYNC_P, and a sync pattern detecting position signal, POSIT, according to a result of the comparison; window unit 13 for generating a window signal, WIN, for opening a window at regular intervals according to a track reference signal; comparator 14 for comparing the pattern matching sync, SYNC_P, output from the sync pattern detector 12 with the window signal, WIN, output from the window part 13 and outputting a sync signal, W_SYNC, according to a result of the comparison; first delay unit 15 for receiving the sync pattern detecting position signal, POSIT, from the sync pattern detector 12 and delaying the position signal until the sync signal, W_SYNC, of the comparator 14 is received; latch unit 16 for latching an output of the first delay unit 15 according to the sync signal, W_SYNC, of the comparator 14 and outputting the sync position signal; second delay unit 17 for delaying the parallel data, PDATA, from the serial to parallel converter 11 until the sync position signal is received; and re-sorting unit 18 for resorting and outputting the parallel data, PDATA, output from the second delay unit 17 according to the sync position signal output from the latch unit 16.

With reference to the accompanying drawings, operation of the conventional apparatus for detecting a sync signal in a digital data record/replay device will now be described.

Primarily, the serial to parallel converter 11 converts serial data, SDATA, and serial clocks, SCLK, which have been input as a result of reconstructing recorded data using an equalizer and phase locked loop (PPL), into parallel data, PDATA, and parallel clocks, PCLK and outputs the parallel data and clocks to the respective sync pattern detector 12 and second delay unit 17.

The sync pattern detector 12 then shifts the parallel data, PDATA, output from the serial to parallel converter 11 by one bit, divides the data into groups each consisting of the predetermined number of bits, and compares each group of bits with a predetermined sync signal pattern. If the data matches the predetermined sync signal pattern, the sync pattern detector 12 outputs a pattern matching sync, SYNC_P, to the comparator 14 and outputs a corresponding sync pattern detected position signal, POSIT, to the first delay unit 15.

The window unit 13 generates a window signal, WIN, to the comparator 14. The window signal is for opening a window at regular intervals according to a track reference signal. The window unit 13 is initialized by a reset signal, RESET, received from the latch unit 16.

The comparator 14 determines whether or not there is the pattern matching sync, SYNC_P, within the window signal, WIN. If there is the pattern matching sync, SYNC_P, the comparator 14 generates a sync signal, W_SYNC, to the latch unit 16.

The first delay unit 15 delays output of the sync pattern position signal, POSIT, from the sync pattern detector 12 to the latch unit 16 until the sync signal, W_SYNC, from the comparator 14 is input to the latch unit 16.

The latch unit 16 then latches the output of the first delay unit 15 and outputs the sync position signal to the re-sorting unit 18 in accordance with the sync signal, W_SYNC, received from the comparator 14.

The second delay unit 17 delays the parallel data from the serial to parallel converter 11 until the sync position signal is input to the re-sorting unit 18.

Subsequently, the re-sorting unit 18 re-sorts the parallel data output from the second delay unit 17 according to the sync position signal output from the latch unit 16 and produces re-sorted parallel data, RE_PDATA.

In such apparatus for detecting a sync signal in the digital data record/replay device according to the conventional art, the sync signal pattern which has been previously set during recording is a very important fact in detecting the sync signal. Damage in a tape, degradation of a signal, and an error in rotative velocity of a drum may interfere with right signal detection.

For example, there occur errors in the sync pattern or data pattern, or the number of clocks of a predetermined sync signal may not coincide with the number of clocks of an actual sync signal.

In the apparatus for detecting a sync signal in the digital data record/replay device according to the conventional art, a pulse generator (PG) signal or a head switching pulse (HSP) signal is used as the track reference signal which is used in the window unit 13 to prevent erroneous detection of the sync signal. These signals may have irregular errors and this may cause the window signal to deviate from a substantial position.

SUMMARY OF THE INVENTION

Accordingly, the present invention is directed to an apparatus for detecting a sync signal in a digital data record/replay device that substantially obviates one or more of the limitations and disadvantages of the related art.

An objective of the present invention is to solve the problem of deviation of a window caused by erroneous detection of a sync signal and disagreement of the numbers of clocks by using a specified window.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, an apparatus for detecting a sync signal in a digital data record/replay device having a parallel clock generator, a parallel data generator, and a window unit comprises: a sync signal detector for comparing a pattern matching sync signal output from a sync pattern detector with an output signal of the window unit and detecting a sync signal according to clocks of the parallel clock generator; a latch unit for latching the sync signal detected by the sync signal detector and outputting the sync signal as a sync position signal according to clocks of the parallel clock generator; an identification error correction code (ID ECC) controller for generating an ID ECC control signal according to the sync position signal of the latch unit; an ID ECC decoder for decoding ID areas of parallel data generated by the parallel data generator; and a sync signal checking unit for outputting the sync position signal of the latch unit as a final sync signal and, when errors are detected as a result of the ID ECC decoding, sending a control signal to the window unit.

The sync signal checking unit outputs the sync position signal from the latch unit as a final sync signal only when an error is not detected as a result of the decoding by the ID ECC decoder.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of which are illustrated in the accompanying drawings.

Figure 2:
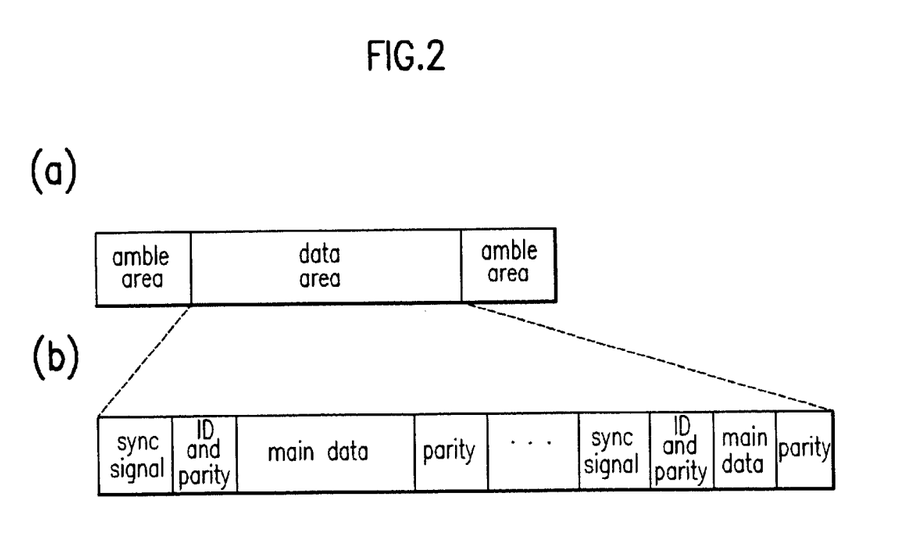
FIGS. 2(a) and 2(b) illustrate a structure of a typical data track.
Figure 3:
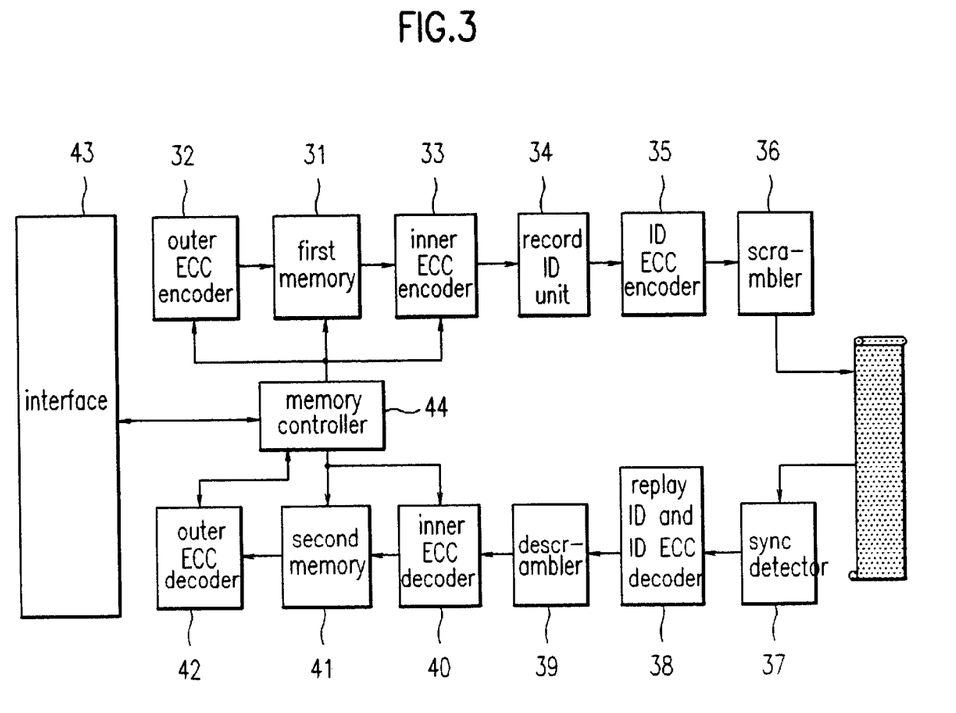
FIG. 3 is a block diagram for explaining general idea of an apparatus for detecting a sync signal in a digital data record/replay device according to the present invention.

Before undertaking the detailed description on an apparatus for detecting a sync signal in a digital data record/replay device according to the present invention, it may be advantageous to set forth concept and background of the present invention with reference to FIGS. 2 and 3.

FIGS. 2(a) and 2(b) illustrate structure of a typical data track. FIG. 3 is a block diagram for explaining general idea of the apparatus for detecting a sync signal in a digital data record/replay device according to the present invention.

As shown in FIG. 2(a), The data track consists of amble areas and data areas. The data area, as shown in FIG. 2(b), consists of a plurality of sync signal areas, identification (ID) and parity areas, main data areas, and parity areas. Namely, the data area may be separated into several sync blocks.

As shown in FIG. 3, during the recording, memory controller 44 receives data from interface 43 and controls outer error correction code (ECC) encoder 32 and inner ECC encoder 33 so as to encode an outer ECC and an inner ECC on the basis of first memory 31 to add a parity to the data.

Record ID unit 34 adds a sync block ID, a track ID, and a shuffle ID to the signal which the parity has been added to.

ID ECC encoder 35 and scrambler 36 respectively encodes and scrambles the signal which the parity, sync block ID, and shuffle ID have been added to, so a sync pattern is added to the signal. Finally the signal is recorded in the form of serial data.

The data and sync pattern which have been recorded through such operation are replayed through data reconstruction.

For the replayed data, the sync signals are detected according to the sync pattern of sync detector 37 and serial data is converted into parallel data. The replayed data is then sent to replay ID and ID ECC decoder 38.

The replay ID and ID ECC decoder 38 decodes an ID of each signal received from the sync detector 37, checks state of each sync signal, and sends only accurate sync signals to descrambler 39.

The descrambler 39 descrambler the signal received from the replay ID and ID ECC decoder 38 and outputs a result signal of the descrambling.

The descrambler 39 also removes inaccurate or counted, forced sync signals because these sync signals are useless in shuffling or descrambling.

The signal descrambled by the descrambler 39 is decoded and shuffled by inner ECC decoder 40, second memory 41, and outer ECC decoder 42, so errors are corrected. The error corrected signal is output through the interface 43 according to control of the memory controller 44.

During the recording or replaying of data, if sync signals or identifications are erroneously detected, a sync block of the data may be stored at a wrong position in the memory after the inner ECC decoding process. This causes decrease in performance of the outer ECC decoder and may have a bad influence on the overall system.

Therefore, it is desirable not to output wrong sync signals, so IDs of input parallel data is decoded using the ECC to determine whether or not there exist any errors and then output of a corresponding sync signal is determined.

With reference to the accompanying drawings, the operation of the apparatus for detecting a sync signal in a digital data record/replay device according to the present invention will be described.

Figure 4:
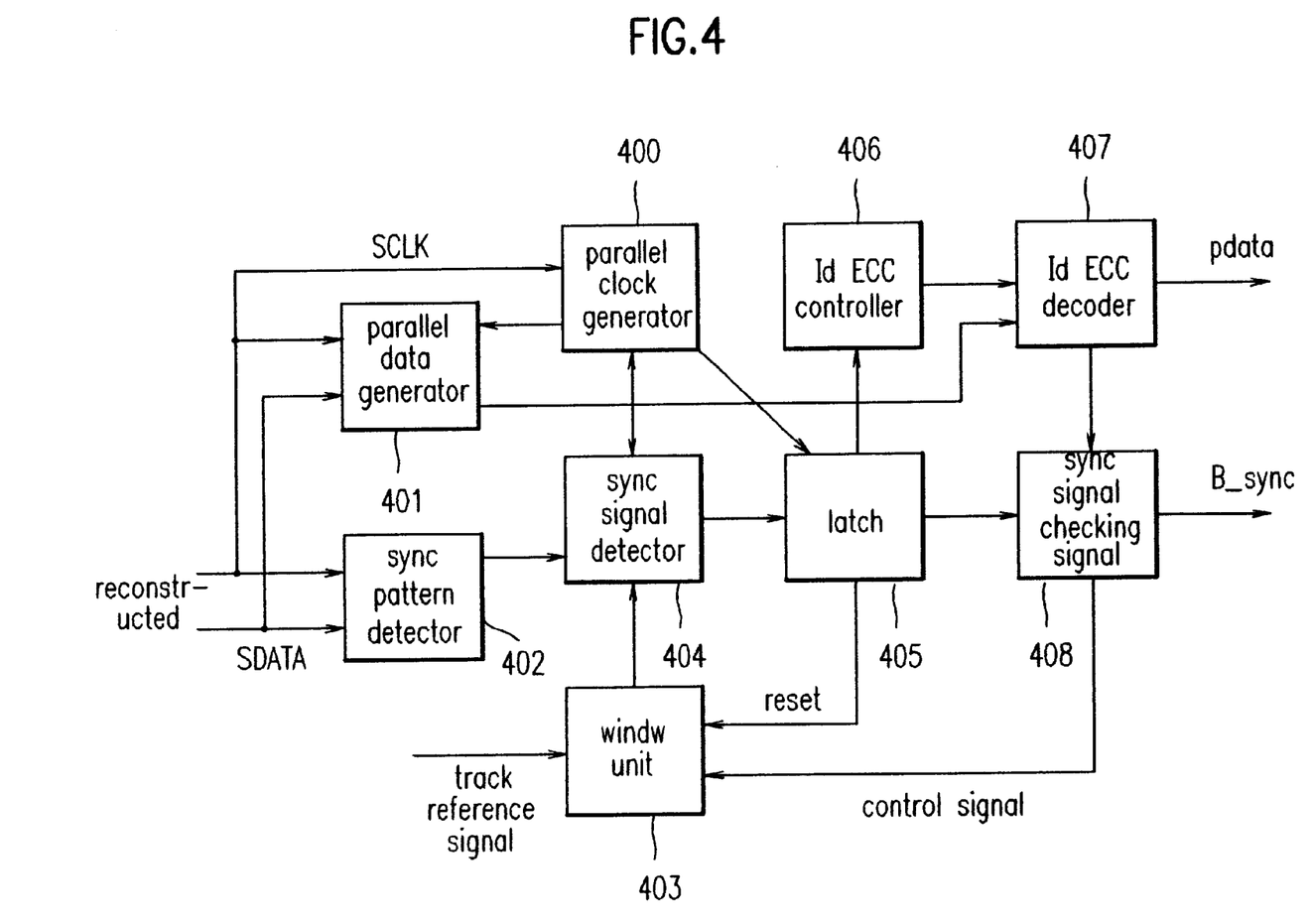
FIG. 4 is a block diagram for illustrating a configuration of an apparatus for detecting a sync signal in a digital data record/replay device according to the present invention.

FIG. 4 is a block diagram for illustrating a configuration of the apparatus for detecting a sync signal in a digital data record/replay device according to the present invention. The apparatus comprises: parallel clock generator 400 for generating parallel clocks, PCLK, according to serial clocks, SCLK, which are input as a result of reconstructing recorded data using an equalizer or PPL; parallel data generator 401 for converting serial data, SDATA, which is input as a result of reconstructing recorded data using the equalizer or PPL according to the serial clocks, SCLK, into parallel data, PDATA; sync pattern detector 402 for detecting a pattern matching sync signal from the input serial clocks, SCLK, and serial data, SDATA which have been input as a result of reconstructing recorded data using the equalizer or PPL; window unit 403 for generating a signal for opening a window at regular intervals according to a track reference signal; sync signal detector 404 for comparing the pattern matching sync signal from the sync pattern detector 402 with the output signal of the window unit 403 and detecting a sync signal according to the clock of the parallel clock generator 400; latch unit 405 for latching the sync signal detected by the sync signal detector 404 and outputting the sync signal as a sync position signal according to the clock of the parallel clock generator 400; ID ECC controller 406 for generating an ID ECC control signal according to the sync position signal of the latch unit 405; ID ECC decoder 407 for decoding ID areas of the parallel data generated by the parallel data generator 401; and sync signal checking unit 408 for outputting the sync position signal of the latch unit 405 as a final sync signal, B_sync, and, when errors are detected as a result of the ID ECC decoding, sending a control signal to the window unit 403.

Figure 5A:
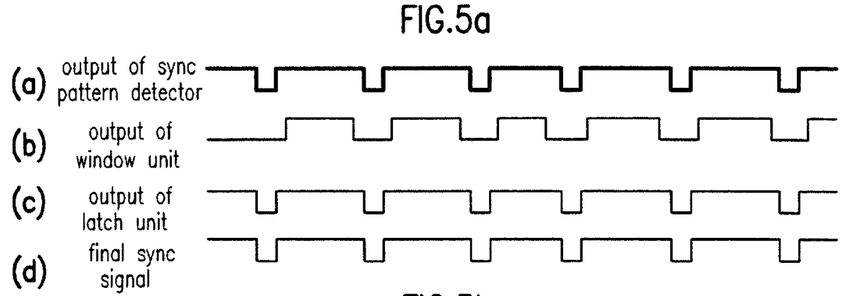
FIG. 5a is a diagram showing wave forms detected from normal blocks depicted in FIG. 4.
Figure 5B:
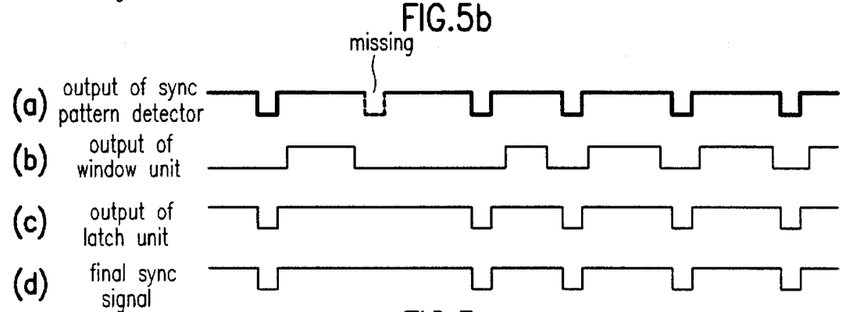
FIG. 5b is a diagram showing wave forms detected from blocks depicted in FIG. 4 when there is a missed pattern matching sync in the middle of a signal.
Figure 5C:
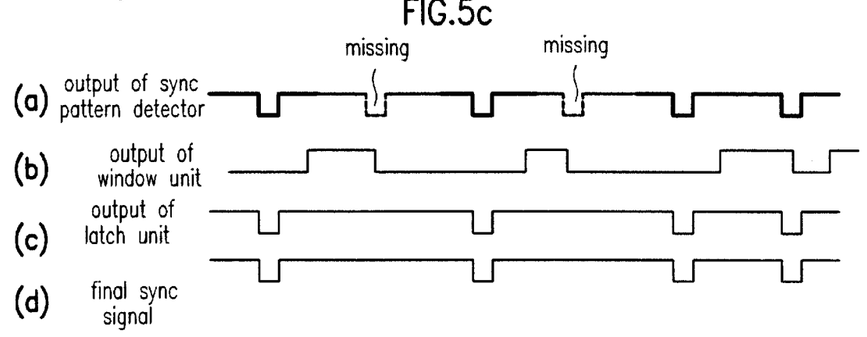
FIG. 5c is a diagram showing wave forms detected from blocks depicted in FIG. 4 when there are two missed pattern matching sync in the middle of a signal.
Figure 5D:
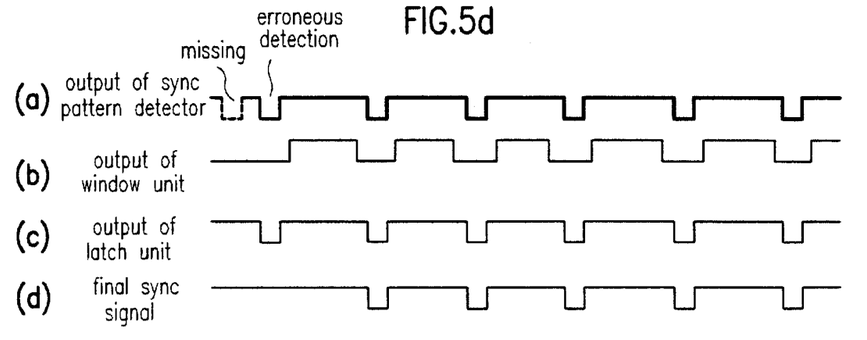
FIG. 5d is a diagram showing wave forms detected from blocks depicted in FIG. 4 when there is an initially missed pattern matching sync.
Figure 5E:
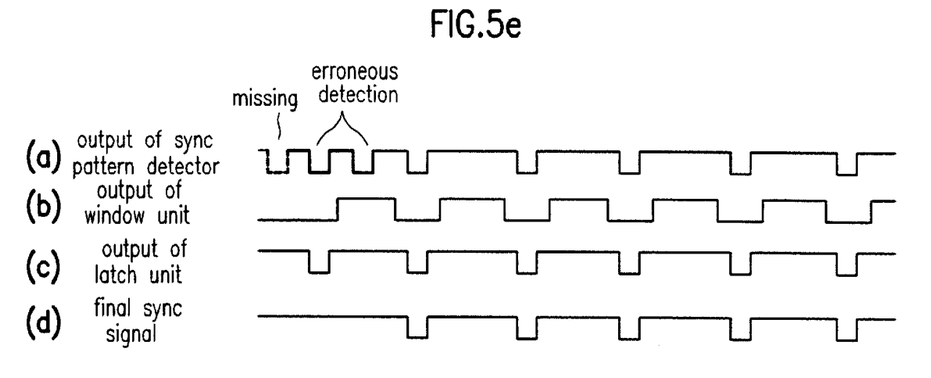
FIG. 5e is a diagram showing wave forms detected from blocks depicted in FIG. 4 when a pattern matching sync is missed and erroneously detected two times at an initial stage.
Figure 5F:
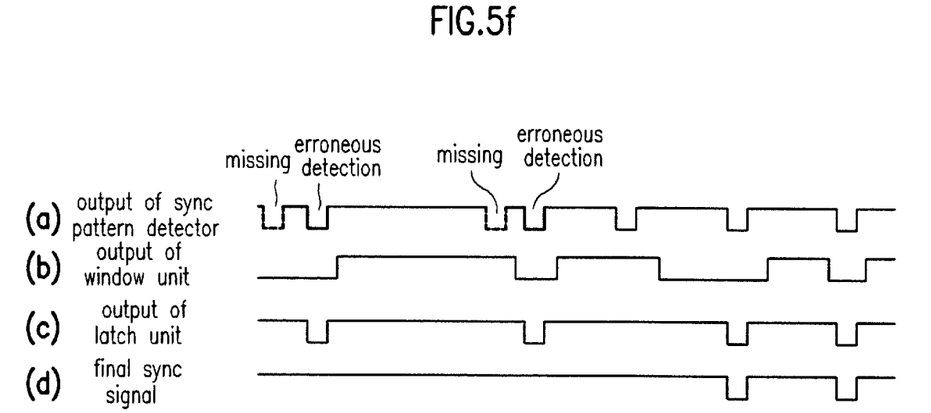
FIG. 5f is a diagram showing wave forms detected from blocks depicted in FIG. 4 when there is a missed and erroneously detected pattern matching sync and such pattern matching sync is repeated.
Figure 5G:
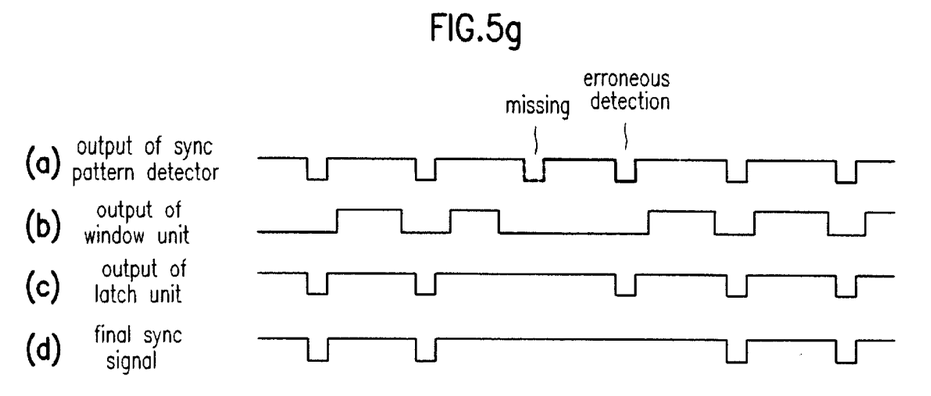
FIG. 5g is a diagram showing wave forms detected from blocks depicted in FIG. 4 when a pattern matching sync is a missed and erroneously detected during normal process.

FIG. 5a is a diagram showing wave forms detected from normal blocks depicted in FIG. 4. FIG. 5b is a diagram showing wave forms detected from blocks depicted in FIG. 4 when there is a missed pattern matching sync in the middle of a signal. FIG. 5c is a diagram showing wave forms detected from blocks depicted in FIG. 4 when there are two missed pattern matching sync in the middle of a signal. FIG. 5d is a diagram showing wave forms detected from blocks depicted in FIG. 4 when there is an initially missed pattern matching sync. FIG. 5e is a diagram showing wave forms detected from blocks depicted in FIG. 4 when a pattern matching sync is missed and erroneously detected two times at an initial stage. FIG. 5f is a diagram showing wave forms detected from blocks depicted in FIG. 4 when there is a missed and erroneously detected pattern matching sync and such pattern matching sync is repeated. FIG. 5g is a diagram showing wave forms detected from blocks depicted in FIG. 4 when a pattern matching sync is a missed and erroneously detected during normal process.

The parallel clock generator 400 generates parallel clocks, PCLK, according to serial clocks, SCLK, which are input as a result of reconstructing recorded data using an equalizer or PPL, and changes width of the clocks in response to a detected sync signal received from the sync signal detector 404 before outputting the clocks.

The parallel data generator 401 converts input serial data, SDATA, which is input in accordance with the serial clocks, SCLK, as a result of reconstructing the recorded data using the equalizer or PPL, into parallel data, PDATA, according to the parallel clocks of the parallel clock generator 400 and outputs the parallel data, PDATA.

The sync pattern detector 402 detects a pattern matching sync signal having one of wave forms (1) shown in FIGS. 5a to 5g from the serial data, SDATA, which has been input according to the serial clock, SCLK, as a result of reconstructing the recorded data through the equalizer and PLL, and sends the pattern matching sync signal to the sync signal detector 404.

The window unit 403 generates signals having wave forms (2) shown in FIGS. 5a to 5g, for opening a window at regular intervals, to the sync signal detector 404 according to a track reference signal. The window unit 403 is initialized by a reset signal, RESET, from the latch unit 405.

The sync signal detector 404 compares the pattern matching sync signal of the sync pattern detector 402 with the output signal of the window unit 403 according to the clocks of the parallel clock generator 400 to detect a sync signal and sends the sync signal to the latch unit 405.

The latch unit 405 latches the sync signal of the sync signal detector 404 according to the parallel clocks generated from the parallel clock generator 40 to output a sync position signal, having one of wave forms (3) shown in FIGS. 5a to 5g, to the respective sync signal checking unit 408 and ID ECC controller 406. The latch unit 405 sends the reset signal to the window unit 403.

The ID ECC controller 406 outputs an ID ECC control signal to the ID ECC decoder 407 in response to the sync position signal of the latch unit 405.

The ID ECC decoder 407 decodes ID areas of the parallel data from the parallel data generator 401 according to the control signal of the ID ECC controller 406 and outputs parallel data, pdata.

The sync signal checking unit 408 outputs the sync position signal, as shown in (3) of FIG. 5a, of the latch unit 405 as a final sync signal, as shown in (4) of FIG. 5a, if no error flag is detected from the pattern matching sync signal of the sync pattern detector 402, as shown in (1) of FIG. 5a, as a result of the decoding by the ID ECC decoder 407. If any error flag is detected from the pattern matching sync signals as shown in (1) of FIGS. 5b to 5g, the sync signal checking unit 408 does not output the sync position signal, as shown in (3) of FIGS. 5b to 5g, of the latch unit 405 as the final sync signal, as shown in (4) of FIGS. 5b to 5g.

If an error flag is determined to occur due to the missing of a pattern matching sync in the middle of the signal, as shown in (1) of FIG. 5b, as a result of the decoding by the ID ECC decoder 407, the sync signal checking unit 408 decides that a sync signal is not detected as a result of comparing the signal of the sync pattern detector 402 with the window signal, as shown in (2) of FIG. 5b, of the window unit 403 and generates a control signal to the window unit 403 so as to make the window unit 403 open the window until the next sync signal is detected in the sync signal detector 404.

The window unit 403 delays output of the window signal corresponding to the missed area, as shown in (2) of FIG. 5b, according to the control signal of the sync signal checking unit 408.

Subsequently, the sync signal detector 404 compares the delayed window signal of the window unit 403 with the signal of the sync pattern detector 402 and detects and outputs a sync signal.

Then the latch unit 405 lets a latch signal, as shown in (3) of FIG. 5b, be on standby, latches the detected sync signal of the sync signal detector 404, and outputs the detected sync signal as a sync position signal.

Accordingly, the sync signal checking unit 408 outputs the sync position signal of the latch unit 405, as shown in (3) of FIG. 5b, as a final sync signal as shown in (4) of FIG. 5b, regardless of a wave form of the latch signal which was on standby.

Alternatively, if error flags are determined to occur due to two missed pattern matching syncs in the middle of the signal, as shown in (1) of FIG. 5c, as a result of the decoding by the ID ECC decoder 407, the sync signal checking unit 408 generates a control signal corresponding to this condition.

If the error flag occurs due to the primarily missed pattern matching sync of the two missed pattern matching syncs, the sync signal checking unit 408 decides that a sync signal is not detected as a result of comparing the signal of the sync pattern detector 402 with the window signal, as shown in (2) of FIG. 5c, of the window unit 403 and generates a control signal to the window unit 403 so as to make the window unit 403 open the window until the next sync signal is detected in the sync signal detector 404.

The window unit 403 delays output of the window signal corresponding to the primarily missed area, as shown in (2) of FIG. 5c, according to the control signal of the sync signal checking unit 408.

Subsequently, the sync signal detector 404 compares the signal of the sync pattern detector 402 with the signal of the window unit 403 and detects and outputs a sync signal.

Then the latch unit 405 lets a latch signal, as shown in (3) of FIG. 5c, be on standby, latches the detected sync signal of the sync signal detector 404, and outputs the detected sync signal as a sync position signal.

Accordingly, the sync signal checking unit 408 outputs the sync position signal of the latch unit 405, as shown in (3) of FIG. 5c, as a sync signal as shown in (4) of FIG. 5c, regardless of a wave form of the latch signal.

After outputting the sync signal, if the error flag occurs due to the second missed pattern sync, the sync signal checking unit 408 decides that a sync signal is not detected as a result of comparing the signal of the sync pattern detector 402 with the window signal, as shown in (2) of FIG. 5c, of the window unit 403 and generates a control signal to the window unit 403 so as to make the window unit 403 open the window until the next sync signal is detected in the sync signal detector 404.

The window unit 403 delays and outputs the window signal corresponding to the second missed area, as shown in (2) of FIG. 5c, according to the control signal of the sync signal checking unit 408.

Subsequently, the sync signal detector 404 compares the signal of the sync pattern detector 402 with the signal of the window unit 403 and detects and outputs a sync signal.

Then the latch unit 405 lets its output signal, as shown in (3) of FIG. 5c, be on standby and latches and outputs the detected sync signal of the sync signal detector 404.

Accordingly, the sync signal checking unit 408 outputs the sync position signal of the latch unit 405, as shown in (3) of FIG. 5c, as a normal, final sync signal as shown in (4) of FIG. 5c, regardless of a wave form of the latch signal.

In case that error flags are determined to occur due to pattern matching syncs which are initially missed and erroneously detected as shown in (1) of FIG. 5d as a result of the decoding by the ID ECC decoder 407, if the error flag occurred due to initial missing of a sync signal, the sync signal checking unit 408 decides that a sync signal is not detected as a result of comparing the signal of the sync pattern detector 402 with the window signal, as shown in (2) of FIG. 5d, of the window unit 403 and generates a control signal to the window unit 403 so as to make the window unit 403 open the window until the next sync signal is detected in the sync signal detector 404.

The window unit 403 delays output of the window signal corresponding to the first missed area, as shown in (2) of FIG. 5d, according to the control signal of the sync signal checking unit 408.

Subsequently, the sync signal detector 404 compares the signal of the sync pattern detector 402 with the signal of the window unit 403 and detects and outputs a sync signal.

Then the latch unit 405 lets a latch signal, as shown in (3) of FIG. 5d, be on standby, latches the detected sync signal of the sync signal detector 404, and outputs the detected sync signal as a sync position signal.

Subsequently, the ID ECC controller 406 outputs an ID ECC control signal according to the sync position signal of the latch unit 405.

The ID ECC decoder 407 decodes ID areas of the parallel data from the parallel data generator 401 according to the control signal of the ID ECC controller 406 and outputs parallel data, pdata.

If an error flag is determined to occur due to erroneous sync signal detection, as shown in (1) of FIG. 5d, as a result of the decoding by the ID ECC decoder 407, the sync signal checking unit 408 decides that a sync signal is erroneously detected as a result of comparing the signal of the sync pattern detector 402 with the window signal, as shown in (2) of FIG. 5d, of the window unit 403 and generates a control signal to the window unit 403 so as to make the window unit 403 open the window until the next sync signal is detected in the sync signal detector 404.

The window unit 403 delays output of the window signal corresponding to the erroneously detected sync signal area, as shown in (2) of FIG. 5d, according to the control signal of the sync signal checking unit 408.

Subsequently, the sync signal detector 404 compares the signal of the sync pattern detector 402 with the signal of the window unit 403 to detect and output a sync signal.

Then the latch unit 405 lets a latch signal, as shown in (3) of FIG. 5d, be on standby, latches the detected sync signal of the sync signal detector 404, and outputs the detected sync signal as a sync position signal.

Accordingly, the sync signal checking unit 408 outputs the sync position signal of the latch unit 405, as shown in (3) of FIG. 5d, as a normal, final sync signal as shown in (4) of FIG. 5d, regardless of a wave form of the latch signal which was on standby.

In case that error flags are determined to occur due to pattern matching syncs which are initially missed and then erroneously detected two times, if one of the error flags occurs due to the pattern matching sync which is initially missed as shown in (1) of FIG. 5e as a result of the decoding by the ID ECC decoder 407, the sync signal checking unit 408 decides that a sync signal is not detected as a result of comparing the signal of the sync pattern detector 402 with the window signal, as shown in (2) of FIG. 5e, of the window unit 403 and generates a control signal to the window unit 403 so as to make the window unit 403 open the window until the next sync signal is detected in the sync signal detector 404.

The window unit 403 delays output of the window signal corresponding to the missed area, as shown in (2) of FIG. 5e, according to the control signal of the sync signal checking unit 408.

Subsequently, the sync signal detector 404 compares the signal of the sync pattern detector 402 with the signal of the window unit 403 and detects and outputs a sync signal.

Then the latch unit 405 lets a latch signal, as shown in (3) of FIG. 5e, be on standby, latches the detected sync signal of the sync signal detector 404, and outputs the detected sync signal as a sync position signal.

Subsequently, the ID ECC controller 406 outputs an ID ECC control signal according to the sync position signal of the latch unit 405.

The ID ECC decoder 407 decodes ID areas of the parallel data from the parallel data generator 401 according to the control signal of the ID ECC controller 406 and outputs parallel data, pdata.

If one of the error flags occurs due to the primary erroneous sync signal detection, as shown in (1) of FIG. 5e, as a result of the decoding by the ID ECC decoder 407, the sync signal checking unit 408 decides that the sync signal is erroneously detected as a result of comparing the signal of the sync pattern detector 402 with the window signal, as shown in (2) of FIG. 5e, of the window unit 403 and generates a control signal to the window unit 403 so as to make the window unit 403 open the window until the next sync signal is detected in the sync signal detector 404.

The window unit 403 delays output of the window signal corresponding to the erroneously detected sync signal area, as shown in (2) of FIG. 5e, according to the control signal of the sync signal checking unit 408.

Subsequently, the sync signal detector 404 compares the signal of the sync pattern detector 402 with the signal of the window unit 403 to detect and output a sync signal.

Then the latch unit 405 lets a latch signal, as shown in (3) of FIG. 5e, be on standby, latches the detected sync signal of the sync signal detector 404, and outputs the detected sync signal as a sync position signal.

If one of the error flags occurs due to the second erroneous sync signal detection, as shown in (1) of FIG. 5e, as a result of the decoding by the ID ECC decoder 407, the sync signal checking unit 408 decides that the sync signal is erroneously detected as a result of comparing the signal of the sync pattern detector 402 with the window signal, as shown in (2) of FIG. 5e, of the window unit 403 and generates a control signal to the window unit 403 so as to make the window unit 403 open the window until the next sync signal is detected in the sync signal detector 404.

The window unit 403 delays output of the window signal corresponding to the erroneously detected sync signal area, as shown in (2) of FIG. 5e, according to the control signal of the sync signal checking unit 408.

Subsequently, the sync signal detector 404 compares the signal of the sync pattern detector 402 with the signal of the window unit 403 to detect and output a sync signal.

Then the latch unit 405 lets a latch signal, as shown in (3) of FIG. 5e, be on standby, latches the detected sync signal of the sync signal detector 404, and outputs the detected sync signal as a sync position signal.

Accordingly, the sync signal checking unit 408 outputs the sync position signal of the latch unit 405, as shown in (3) of FIG. 5e, as a normal, final sync signal as shown in (4) of FIG. 5e, regardless of a wave form of the standby latch signal.

In case that error flags are determined to occur due to pattern matching syncs which are initially missed and then erroneously detected, as shown in (1) of FIG. 5f, as a result of the decoding by the ID ECC decoder 407, if one of the error flags occurs due to the initially missed sync signal, the sync signal checking unit 408 decides that a sync signal is not detected as a result of comparing the signal of the sync pattern detector 402 with the window signal, as shown in (2) of FIG. 5f, of the window unit 403 and generates a control signal to the window unit 403 so as to make the window unit 403 open the window until the next sync signal is detected in the sync signal detector 404.

The window unit 403 delays output of the window signal corresponding to the missed area, as shown in (2) of FIG. 5f, according to the control signal of the sync signal checking unit 408.

Subsequently, the sync signal detector 404 compares the signal of the sync pattern detector 402 with the signal of the window unit 403 and detects and outputs a sync signal.

Then the latch unit 405 lets a latch signal, as shown in (3) of FIG. 5f, be on standby, latches the detected sync signal of the sync signal detector 404, and outputs the detected sync signal as a sync position signal.

Subsequently, the ID ECC controller 406 outputs an ID ECC control signal according to the sync position signal of the latch unit 405.

The ID ECC decoder 407 decodes ID areas of the parallel data from the parallel data generator 401 according to the control signal of the ID ECC controller 406 and outputs parallel data, pdata.

If one of the error flags is determined to occur due to the erroneous sync signal detection, as shown in (1) of FIG. 5f, as a result of the decoding by the ID ECC decoder 407, the sync signal checking unit 408 decides that a sync signal is erroneously detected as a result of comparing the signal of the sync pattern detector 402 with the window signal, as shown in (2) of FIG. 5f, of the window unit 403 and generates a control signal to the window unit 403 so as to make the window unit 403 open the window until the next sync signal is detected in the sync signal detector 404.

The window unit 403 delays output of the window signal corresponding to the erroneously detected sync signal area, as shown in (2) of FIG. 5f, according to the control signal of the sync signal checking unit 408.

Subsequently, the sync signal detector 404 compares the signal of the sync pattern detector 402 with the signal of the window unit 403 to detect and output a sync signal.

Then the latch unit 405 lets a latch signal, as shown in (3) of FIG. 5f, be on standby, latches the detected sync signal of the sync signal detector 404, and outputs the detected sync signal as a sync position signal.

In case that error flags occurring due to pattern matching syncs which are missed and then erroneously detected are detected again, as shown in (1) of FIG. 5f, as a result of the decoding by the ID ECC decoder 407, if one of the error flags occurs due to the missed pattern matching sync, the sync signal checking unit 408 decides that a sync signal is not detected as a result of comparing the signal of the sync pattern detector 402 with the window signal, as shown in (2) of FIG. 5f, of the window unit 403 and generates a control signal to the window unit 403 so as to make the window unit 403 open the window until the next sync signal is detected in the sync signal detector 404.

The window unit 403 delays output of the window signal corresponding to the newly missed area, as shown in (2) of FIG. 5f, according to the control signal of the sync signal checking unit 408.

Subsequently, the sync signal detector 404 compares the signal of the sync pattern detector 402 with the signal of the window unit 403 and detects and outputs a sync signal.

Then the latch unit 405 lets a latch signal, as shown in (3) of FIG. 5f, be on standby, latches the detected sync signal of the sync signal detector 404, and outputs the detected sync signal as a sync position signal.

Subsequently, the ID ECC controller 406 outputs an ID ECC control signal according to the sync position signal of the latch unit 405.

The ID ECC decoder 407 decodes ID areas of the parallel data from the parallel data generator 401 according to the control signal of the ID ECC controller 406 and outputs parallel data, pdata.

If one of the error flags occurs again due to the erroneous sync signal detection, as shown in (1) of FIG. 5f, as a result of the decoding by the ID ECC decoder 407, the sync signal checking unit 408 decides that a sync signal is erroneously detected as a result of comparing the signal of the sync pattern detector 402 with the window signal, as shown in (2) of FIG. 5f, of the window unit 403 and generates a control signal to the window unit 403 so as to make the window unit 403 open the window until the next sync signal is detected in the sync signal detector 404.

The window unit 403 delays output of the window signal corresponding to the erroneously and newly detected sync signal area, as shown in (2) of FIG. 5f, according to the control signal of the sync signal checking unit 408.

Subsequently, the sync signal detector 404 compares the signal of the sync pattern detector 402 with the signal of the window unit 403 to detect and output a sync signal.

Then the latch unit 405 lets a latch signal, as shown in (3) of FIG. 5f, be on standby, latches the detected sync signal of the sync signal detector 404, and outputs the detected sync signal as a sync position signal.

Accordingly, the sync signal checking unit 408 outputs the sync position signal of the latch unit 405, as shown in (3) of FIG. 5f, as a normal, final sync signal as shown in (4) of FIG. 5f regardless of a wave form of the latch signal which was on standby.

In case that error flags caused by pattern matching syncs which are missed and erroneously detected as shown in (1) of FIG. 5g are detected as a result of the decoding by the ID ECC decoder 407 while the sync position signal of the latch unit 405, as shown in (3) of FIG. 5f, is being output as the normal, final sync signal as shown in (4) of FIG. 5f, if one of the error flags occurs due to the missed sync signal, the sync signal checking unit 408 decides that a sync signal is not detected as a result of comparing the signal of the sync pattern detector 402 with the window signal, as shown in (2) of FIG. 5g, of the window unit 403 and generates a control signal to the window unit 403 so as to make the window unit 403 open the window until the next sync signal is detected in the sync signal detector 404.

The window unit 403 delays output of the window signal corresponding to the missed area, as shown in (2) of FIG. 5g, according to the control signal of the sync signal checking unit 408.

Subsequently, the sync signal detector 404 compares the signal of the sync pattern detector 402 with the signal of the window unit 403 and detects and outputs a sync signal.

Then the latch unit 405 lets a latch signal, as shown in (3) of FIG. 5g, be on standby, latches the detected sync signal of the sync signal detector 404, and outputs the detected sync signal as a sync position signal.

Subsequently, the ID ECC controller 406 outputs an ID ECC control signal according to the sync position signal of the latch unit 405.

The ID ECC decoder 407 decodes ID areas of the parallel data from the parallel data generator 401 according to the control signal of the ID ECC controller 406 and outputs parallel data, pdata.

If one of the error flags is determined to occur due to the erroneous sync signal detection, as shown in (1) of FIG. 5g, as a result of the decoding by the ID ECC decoder 407, the sync signal checking unit 408 decides that a sync signal is erroneously detected as a result of comparing the signal of the sync pattern detector 402 with the window signal, as shown in (2) of FIG. 5g, of the window unit 403 and generates a control signal to the window unit 403 so as to make the window unit 403 open the window until the next sync signal is detected in the sync signal detector 404.

The window unit 403 delays output of the window signal corresponding to the erroneously detected sync signal area, as shown in (2) of FIG. 5g, according to the control signal of the sync signal checking unit 408.

Subsequently, the sync signal detector 404 compares the signal of the sync pattern detector 402 with the signal of the window unit 403 to detect and output a sync signal.

Then the latch unit 405 lets a latch signal, as shown in (3) of FIG. 5g, be on standby, latches the detected sync signal of the sync signal detector 404, and outputs the detected sync signal as a sync position signal.

Accordingly, the sync signal checking unit 408 outputs the sync position signal of the latch unit 405, as shown in (3) of FIG. 5g, as a normal, final sync signal as shown in (4) of FIG. 5g regardless of a wave form of the latch signal which was on standby.

Such apparatus for detecting a sync signal in a digital data record/replay device according to the present invention can be applied to a DVD (digital video disc) player as well as a digital VCR.

As illustrated above, the apparatus for detecting a sync signal in a digital data record/replay device according to the present invention can check sync signals using the ID ECC and restore normal sync signals when an initial sync signal is erroneously detected due to unstableness of initial window signal or when sync signals are missed and erroneously detected due to change of clocks during the normal replay.

It will be apparent to those skilled in the art that various modifications and variations can be made in an apparatus for detecting a sync signal in a digital data record/replay device of the present invention without deviating from the spirit or scope of the invention. Thus, it is intended that the present invention covers the modifications and variations of this invention provided they come within the scope of the appended claims and their equivalents.

What is claimed is:

1. An apparatus for detecting a sync signal in a digital data record/replay device having a parallel clock generator, a parallel data generator, and a window unit, said apparatus comprising:

a sync signal detector for comparing a pattern matching sync signal output from a sync pattern detector with an output signal of said window unit and detecting a sync signal according to clocks of said parallel clock generator;

a latch unit for latching the sync signal detected by said sync signal detector and outputting said sync signal as a sync position signal according to clocks of said parallel clock generator;

an identification error correction code (ID ECC) controller for generating an ID ECC control signal according to the sync position signal of said latch unit;

an ID ECC decoder for decoding ID areas of parallel data generated by said parallel data generator; and a sync signal checking unit for outputting the sync position signal of said latch unit as a final sync signal and, when errors are detected as a result of the ID ECC decoding, sending a control signal to said window unit.

2. An apparatus for detecting a sync signal according to claim 1, wherein said sync signal checking unit outputs the sync position signal from said latch unit as a final sync signal only when an error is not detected as a result of the decoding by said ID ECC decoder.

* * * * *